(12) United States Patent
Yasuda

(10) Patent No.: US 8,460,611 B2
(45) Date of Patent: Jun. 11, 2013

(54) POLLUTION CONTROL DEVICES, REINFORCED MAT MATERIAL FOR USE THEREIN AND METHODS OF MAKING SAME

(75) Inventor: Daigo Yasuda, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 420 days.

(21) Appl. No.: 12/668,165

(22) PCT Filed: Jul. 9, 2008

(86) PCT No.: PCT/US2008/069537
§ 371 (c)(1),
(2), (4) Date: Oct. 27, 2010

(87) PCT Pub. No.: WO2009/009600
PCT Pub. Date: Jan. 15, 2009

(65) Prior Publication Data
US 2011/0030356 A1   Feb. 10, 2011

Related U.S. Application Data

(60) Provisional application No. 60/950,299, filed on Jul. 17, 2007, provisional application No. 60/948,883, filed on Jul. 10, 2007.

(51) Int. Cl.
*B01D 50/00* (2006.01)
*B32B 5/12* (2006.01)

(52) U.S. Cl.
USPC .......................................... 422/179; 428/110

(58) Field of Classification Search
USPC ........................ 422/179, 180; 428/110, 201
See application file for complete search history.

(56) References Cited

U.S. PATENT DOCUMENTS

| | | | |
|---|---|---|---|
| 3,876,384 A | 4/1975 | Santiago et al. | |
| 4,302,495 A | 11/1981 | Marra | |
| 4,328,187 A * | 5/1982 | Musall et al. | 422/179 |
| 4,335,077 A | 6/1982 | Santiago et al. | |
| 4,999,168 A | 3/1991 | Ten Eyck | |
| 5,008,086 A * | 4/1991 | Merry | 422/180 |
| 6,245,302 B1 * | 6/2001 | Fujitsubo | 422/180 |
| 6,458,418 B2 | 10/2002 | Langer et al. | |
| 6,967,006 B1 * | 11/2005 | Wirth et al. | 422/179 |
| 7,423,497 B2 | 9/2008 | Pathak et al. | |
| 2009/0304560 A1 | 12/2009 | Dietz et al. | |

FOREIGN PATENT DOCUMENTS

| | | |
|---|---|---|
| EP | 0 319 299 | 6/1989 |
| JP | 54-071770 | 6/1979 |
| JP | 56-003332 | 1/1981 |
| JP | 56-003333 | 1/1981 |
| JP | 2003/293755 | 10/2003 |

* cited by examiner

*Primary Examiner* — Tom Duong

(57) ABSTRACT

A reinforced mat (10) for a pollution control device has a first major surface (12), a second major surface (14) and a thickness, and the mat comprises ceramic fibers and a reinforcing mesh (22) disposed between the first major surface and the second major surface such that the mat is generally separated into two layers (16,18) by the mesh. The mesh comprises non-metallic fibers that are spaced-apart so as to define a space therebetween that is large enough that the layers of the mat are integrally joined together through the mesh. The mat has a total organic component weight that is up to about 5% of the total weight of the mat, and the mat is dimensioned for use, either as a mounting mat for mounting a pollution control element or as an insulator for insulating a region within a pollution control device in an exhaust system of an internal combustion engine.

20 Claims, 3 Drawing Sheets

POLLUTION CONTROL DEVICES, REINFORCED MAT MATERIAL FOR USE THEREIN AND METHODS OF MAKING SAME

Cross Reference to Related Applications

This application is a national stage filing under 35 U.S.C. § 371 of PCT/US2008/069537, filed Jul. 9, 2008, which claims priority to U.S. Provisional Application No. 60/948883, filed Jul. 10, 2007, the disclosure of which is incorporated by reference in its/their entirety herein.

FIELD

The present invention relates to a pollution control devices, in particular, to mat material suitable for use within a pollution control device, more particularly, to mat material having a low organic content and being suitable for mounting a pollution control element in a pollution control device or for insulating portions of a pollution control device, and even more particularly, to methods of making such mat material and devices.

BACKGROUND

Pollution control devices are employed on motor vehicles to control atmospheric pollution. Such devices include catalytic converters and diesel particulate filters or traps. Catalytic converters typically contain a ceramic monolithic structure which supports the catalyst (i.e., a catalyst carrier or element). Diesel particulate filters or traps are typically wall flow filters which have honeycombed monolithic structures typically made from porous crystalline ceramic materials (i.e., filter element). Each of these devices has a metal housing (typically stainless steel) in which the pollution control element is contained. A mat comprising ceramic fiber is typically used to mount and protect the pollution control element within the housing. Filter elements, as well as catalyst carriers, can have walls with a catalyst thereon. The catalyst oxidizes carbon monoxide and hydrocarbons, and reduces the oxides of nitrogen in engine exhaust gases to control atmospheric pollution.

Mounting mats comprising ceramic fibers, which are used in such devices, are usually composed of up to 10% organic binder. The binder is used to hold the fibers together. Without such a high binder ratio, many problems can occur such as, for example, surface cracks in the mat during assembly of the pollution control device, low tensile strength of the mat and a lower bulk density.

The present invention is directed to providing a low binder content mat for use in a pollution control device, which does not exhibit one or more of such problems.

SUMMARY OF THE INVENTION

In one aspect of the present invention, a reinforced mat is provided that is dimensioned for use, and designed for surviving, within a pollution control device for an exhaust system of an internal combustion engine. The mat has a first major surface, a second major surface and a thickness, and the mat comprises ceramic fibers (e.g., refractory ceramic fibers, glass fibers or a combination thereof) and a reinforcing mesh (e.g., a netting) disposed between the first major surface and the second major surface such that the mat is generally separated into two layers by the mesh. The mesh comprises non-metallic fibers (i.e., ceramic fibers, glass fibers, polymeric fibers or a combination thereof) that are spaced-apart so as to define a space or opening therebetween that is large enough that the layers of the mat can be integrally joined together through the mesh.

The mat has a total organic component weight (e.g., organic binder content, organic fiber binder content and/or organic fiber mesh content) that is less than or equal to about 5% of the total weight of the mat. The mat is dimensioned for use, either as a mounting mat for mounting a pollution control element (e.g., a catalyst carrier, a filter element and/or a catalyzed filter element) or as an insulator for insulating a region or portion within a pollution control device (e.g., a catalytic converter, engine exhaust filter, etc.) in an exhaust system of an internal combustion engine.

The mesh used in the present mat can be made of spaced-apart polymeric fibers, which contribute in the range of from about 0.4% to about 2.0% by weight to the total organic component weight of the mat. The spaced-apart non-metallic fibers of the mesh can be disposed so as to overlap one another and, thereby, form a netting with openings defined by spaced-apart and overlapping non-metallic fibers of the mesh, or so as not to intersect one another.

It is desirable for the total organic component weight of the mat to be less than or equal to about 2.5% of the total weight of the mat. It is more desirable for the total organic component weight of the mat to be less than or equal to about 1.5% of the total weight of the mat. The mat can comprise an organic binder that provides all of the total organic component weight of the mat.

In an additional aspect of the present invention, an exhaust system is provided for an internal combustion engine, where the exhaust system comprises a pollution control device according to the present invention.

It is also an aspect of the present invention to provide an internal combustion engine that comprises an exhaust system, which includes a pollution control device according to the present invention.

It is a further aspect of the present invention to provide a method for making a reinforced mat, according to the present invention. The method comprises: forming a first layer comprising ceramic fibers; forming a second layer comprising ceramic fibers; sandwiching the mesh between a major face of the first layer and a major face of the second layer; attaching the major face of the first layer and the major face of the second layer together such that the first layer and the second layer of the mat are integrally joined together through at least a portion of the space of the mesh; and dimensioning the mat for use either as a mounting mat for mounting a pollution control element, or as an insulator for insulating a region, within a pollution control device in an exhaust system of an internal combustion engine. The resulting mat has a total organic component weight that is less than or equal to about 5% of the total weight of the mat.

The first layer and/or the second layer can be formed using a wet laid process or any other suitable process. The major face of the first layer and the major face of the second layer can be attached together with or without the use of auxiliary bonding means (e.g., a laminating adhesive). If a wet laid process is used, without any auxiliary bonding means, ceramic fibers from at least one of the layers pass through the space of the mesh and into the other of the layers.

These and other advantages of the invention are more fully shown and described in the drawings and detailed description of this invention, where like reference numerals are used to represent similar parts. It is to be understood, however, that the drawings and description are for illustration purposes only and should not be read in a manner that would unduly limit the scope of this invention.

BRIEF DESCRIPTION OF THE DRAWINGS

The invention may be further understood by reference to the accompanying drawings, wherein like parts are indicated by similar reference numerals throughout the several views.

DETAILED DESCRIPTION OF THE PREFERRED EMBODIMENTS

In describing preferred embodiments of the invention, specific terminology is used for the sake of clarity. The invention, however, is not intended to be limited to the specific terms so selected, and each term so selected includes all technical equivalents that operate similarly. A reinforced mat according to the present invention is dimensioned for use, and designed for surviving, within a pollution control device for an exhaust system of an internal combustion engine.

Figure 1A:
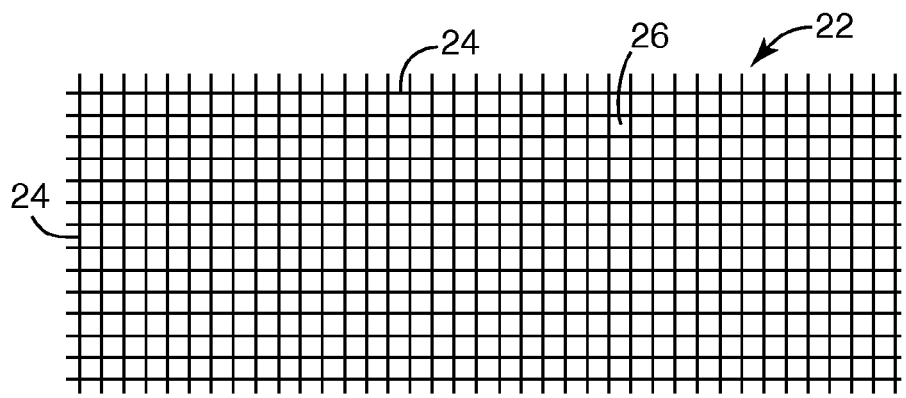
FIG. 1A is a plan view of reinforcing netting in accordance with one embodiment of the present invention.
Figure 1B:
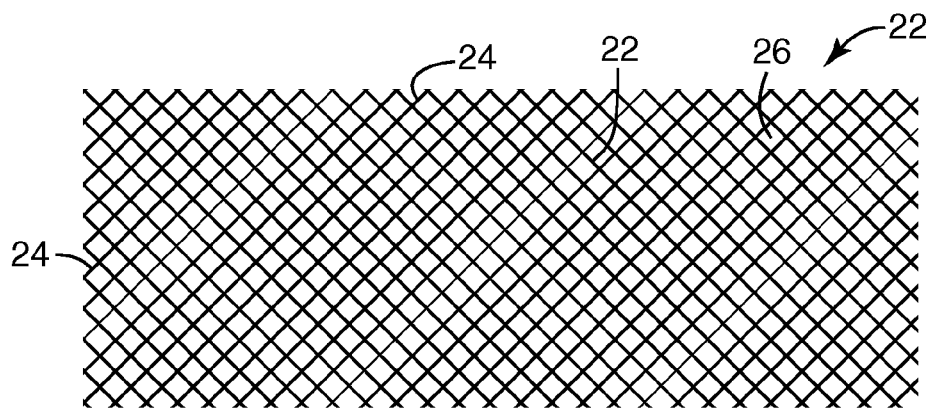
FIG. 1B is a plan view of reinforcing netting in accordance with another embodiment of the present invention.
Figure 1C:
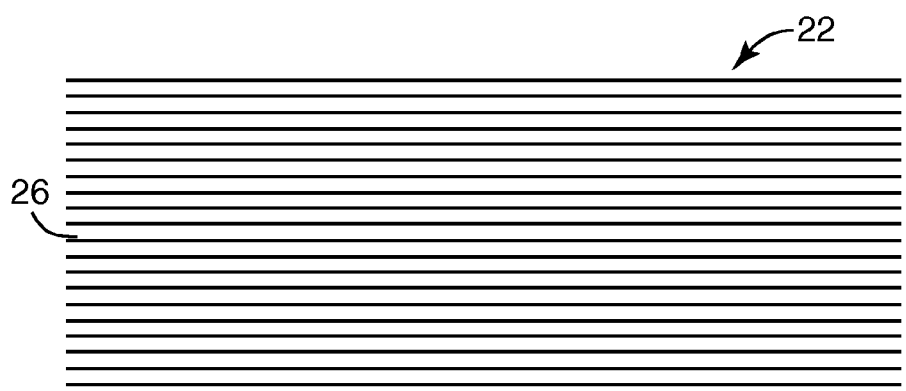
FIG. 1C is a plan view of reinforcing netting in accordance with an additional embodiment of the present invention.
Figure 2:
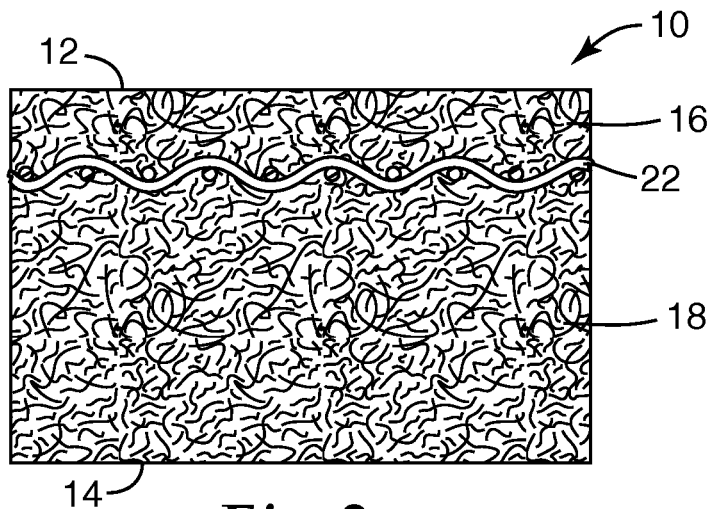
FIG. 2 is a cross sectional view of a mounting mat reinforced in accordance with one embodiment of the present invention.
Figure 3:
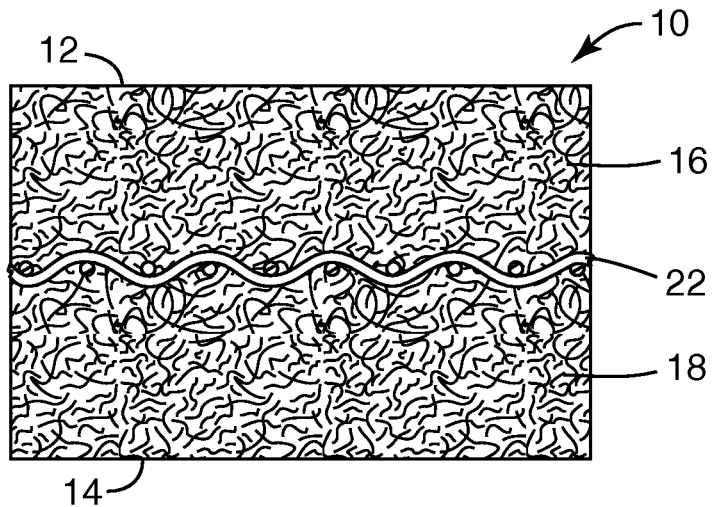
FIG. 3 is a cross sectional view of a mounting mat reinforced in accordance with another embodiment of the present invention.
Figure 4:
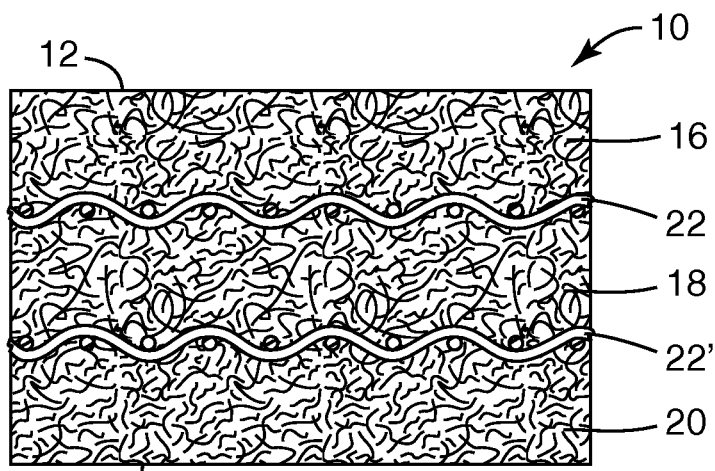
FIG. 4 is a cross sectional view of a mounting mat reinforced in accordance with an additional embodiment of the present invention.
Figure 5:
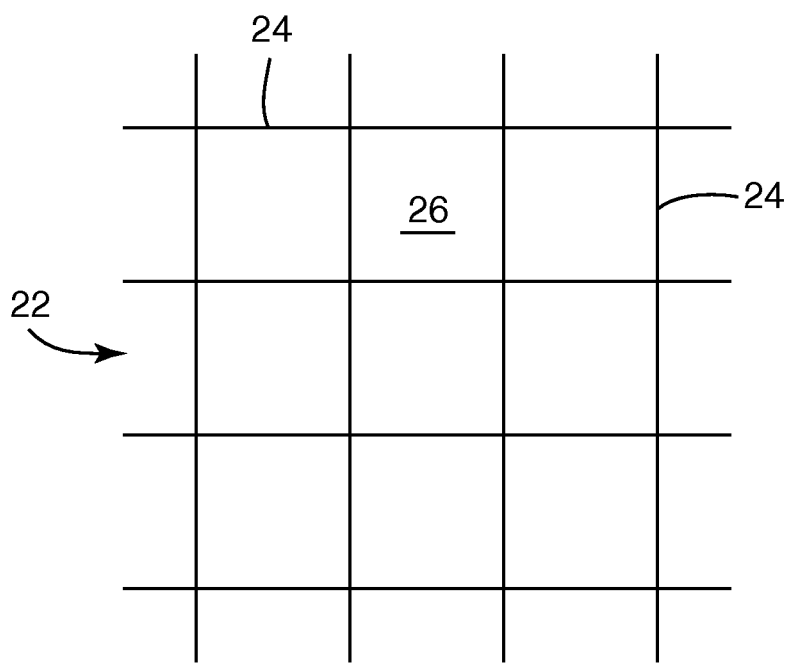
FIG. 5 is an enlarged plan view of the reinforcing netting of FIG. 1A.

Referring to FIGS. 2-4, a reinforced mat 10 according to the present invention has a first major surface 12, a second major surface 14 and a thickness (i.e., the distance between surfaces 12 and 14). The mat 10 has at least a first layer 16 and a second layer 18 and may include one or more additional layers 20 (see FIG. 4). Each of these mat layers 16, 18, 20 comprises ceramic fibers such as, for example, refractory ceramic fibers (e.g., alumina fibers, alumina-silica fibers, etc.), glass fibers (e.g., silica fibers, etc), or a combination thereof and any other desired material (e.g., intumescent materials). In the embodiments of FIGS. 2 and 3, a reinforcing mesh 22 is disposed between the layers 16 and 18 so as to be generally co-planer with the first major surface 12 and the second major surface 14. In the embodiment of FIG. 4, another reinforcing mesh 22' is also disposed between the layers 18 and 20.

Figure 6:
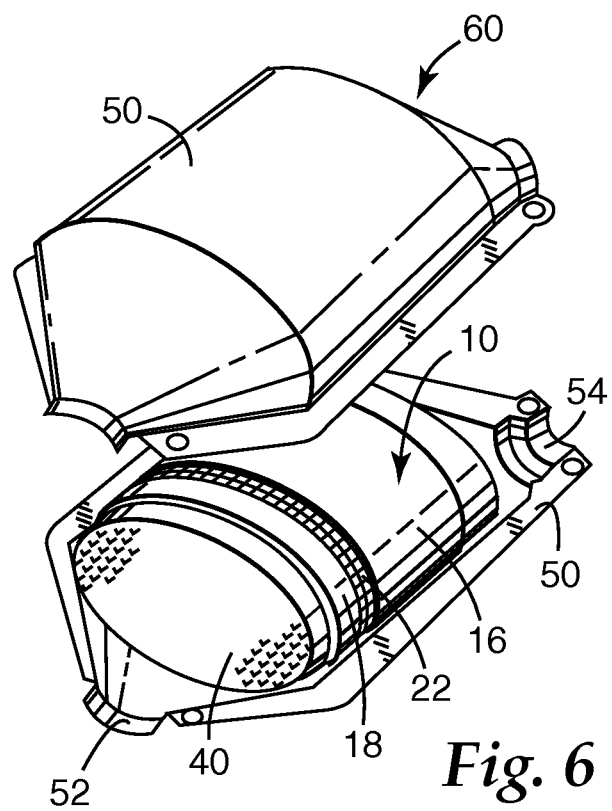
FIG. 6 is a perspective view of an opened pollution control device comprising a reinforced mounting mat, according to the present invention, with portions of the mat removed so as to more clearly see a first layer comprising ceramic fibers, a reinforcing netting and a second layer comprising ceramic fibers.

Referring to FIG. 6, a pollution control device 60 (e.g., a catalytic converter and/or an exhaust filter), according to the present invention, can comprise a housing 50, a pollution control element 40 (e.g., a catalytic element and/or filter) mounted inside of the housing 50, and a mounting mat 10 like those described herein sandwiched between so as to mount the element 40 within the housing 50. The housing 50 is typically made of a metal such as, for example stainless steel, and includes an inlet 52 and an outlet 54 to allow exhaust gases from an internal combustion engine to pass through the device 60. The element 40 is typically a thin walled monolithic structure that is relatively fragile. The mat 10 provides protection for the element 40 from both thermal and mechanical (e.g., vibrational) related damage.

Referring to FIG. 2, it can be desirable for the mesh 22 to be positioned close to the surface 12 of the mat 10 (i.e., for the layer 16 to be relatively thinner than the layer 18). For example, with a mat 10 having a total weight of about 1600 $g/m^2$, and the netting 22 having a weight in the range of from about 80 to about 160 $g/m^2$, it can be desirable for the layer 16 to have a weight in the range of from about 40 to about 800 $g/m^2$. Put another way, it can be desirable for the layer 16 to comprise in the range of from 3% to 10% of the total weight of the mat 10.

Referring to FIGS. 1A-1C and FIG. 5, the mesh 22 of the present invention comprises non-metallic fibers 24 (i.e., ceramic fibers, glass fibers, polymeric fibers or a combination thereof). It can be desirable for the fibers 24 to be made of glass. In the illustrated embodiments, the fibers 24 are generally co-planer and spaced-apart so as to define a space or opening 26 therebetween. The spaced-apart non-metallic fibers 24 can be disposed so as not to intersect one another (e.g., see FIG. 1C), so as to cross-over or otherwise overlap one another (e.g., see FIGS. 1A and 1B), or a combination thereof. The preferred embodiment of the illustrated mesh designs is that shown in FIG. 1A. The mesh design of FIG. 1C, with skewed fibers 24, is the least desired of the illustrated embodiments, because it can cause the layers 16, 18, 20 to separate when the mat 10 is bent (e.g., when wrapped around a catalyst carrier or filter element).

The opening 26 is large enough to allow the layers 16, 18, 20, as applicable, of the mat 10 to be integrally joined or bonded together through the mesh 22. That is, each pair of opposing layers 16 and 18, and 18 and 20, can be bonded together through the openings 26 with an auxiliary bonding means (e.g., an organic and/or inorganic laminating adhesive). Alternatively, or in addition, each pair of opposing layers can be bonded together without auxiliary bonding means such as, for example, with a wet laid process. If a wet laid process is used, without any auxiliary bonding means, the ceramic fibers from at least one, and preferably both, of the opposing layers 16 and 18, and 18 and 20, pass through the mesh openings 26 and into the corresponding opposing layer. Each of the mat layers 16, 18, 20 can be formed using a wet laid process or any other suitable process, before being bonded together.

An example of a process that may be used to bond such opposing layers through the mesh opening 26 using auxiliary bonding means, according to the present invention, is disclosed in International (PCT) Patent Application No. US2007/069839, filed May 29, 2007, and entitled Multilayer Mounting Mat, which is incorporated herein by reference in its entirety. In such a process, a reinforced mat having multiple layers can be made by first providing a base or lower layer 18, applying a coating of an inorganic adhesive onto the top surface of the lower layer 18, positioning the mesh 22 on top of the lower layer 18, and then positioning an upper layer 16 so that the mesh 22 is sandwiched between the layers 16 and 18. This multilayer construction is then compressed and the adhesive cured to form the finished reinforced mat.

An example of a process that may be used to bond such opposing layers through the mesh openings 26 without the use of auxiliary bonding means is a "wet laid" process such as that disclosed in U.S. Pat. No. 6,458,418, which is incorporated herein by reference in its entirety. In such a wet laid process, a reinforced mat having multiple layers can be made using at least two dilute (desirably, not over 5 percent solids by weight) aqueous slurries containing ceramic fibers and any other desired materials, depositing the first slurry onto a permeable substrate, such as a screen or a "wire" of a paper making machine, partially dewatering the first slurry by gravity and/or vacuum to form a base or "lower" layer 18, positioning the mesh 22 on top of the lower layer 18, depositing the second slurry onto the mesh 22 and the partially dewatered lower layer 18, partially dewatering the second or top layer 16, and then pressing to increase the density (e.g., with pressure rollers) of both layers 16 and 18 with the mesh 22 sandwiched therebetween. This multilayer construction is then fully dried with heated rollers to form the finished reinforced mat.

It is to be understood that either or any of the layers of the mat of the present invention may be formed first as the lower layer of the mat. However, the layer having the greatest thickness when dry (e.g., the layer 18 in the FIG. 2 embodiment) is desirably the layer that is formed first.

Depending on the materials used to make the mat layers 16, 18, 20, it can be desirable for the non-metallic fibers 24 to be spaced-apart a minimum distance in the range of from at least about 1.5 mm to at least about 8.0 mm, in order for the mat material above and below the mesh 22 to be integrally joined together through the spacing 26 between the mesh fibers 24. It can be desirable for the non-metallic fibers 24 to be spaced-apart in a range of from at least about 1.5 mm to about 25 mm, and it may be more desirable for this spacing to be in the range of from at least about 8.0 mm to about 15 mm. It can be preferred for the non-metallic fibers 24 to be crossing-over one another so as to form a netting with openings 26 defined by the overlapping and spaced-apart non-metallic fibers 24 (see FIGS. 1A, 1B and 5). The openings 26 of such a netting 22 can have a mesh size or area of at least about 2.25 mm$^2$ (e.g., 1.5×1.5 mm) or in the range of from about 2.25 mm$^2$ (e.g., 1.5×1.5 mm) to about 625 mm$^2$ (e.g., 25×25 mm). It can be desirable for the openings 26 to have a mesh size in the range of from about 64.0 mm$^2$ (e.g., 8.0×8.0 mm) to about 225 mm$^2$ (e.g., 15 mm×15 mm). Depending on the materials used to make the mat layers 16, 18, 20, it can be desirable for the openings 26 to have a minimum mesh size or area in the range of from at least about 2.25 mm$^2$ (e.g., 1.5×1.5 mm) to at least about 64.0 mm$^2$ (e.g., 8.0×8.0 mm).

The mat 10 has a total organic component weight (e.g., organic binder content, organic fiber binder content and/or organic fiber mesh content) that is less than or equal to about 5% of the total weight of the mat 10. It is preferred that the mat 10 have the lowest total organic component weight possible without detrimentally affecting the performance and properties of the mat 10. Therefore, it is desirable for the mat 10 to have an organic component weight of less than or equal to 4.5%, 4.0%, 3.5%, 3.0%, 2.5%, 2.0%, 1.5%, 1.0% or even 0%. It has been found to be commercially desirable to have a total organic component weight of less or equal to 1.5% of the total weight of the mat. When the fibers 24 used to make the mesh 22 are organic (e.g., polymeric), it can be desirable for the fibers 24 to only contribute in the range of from about 0.4% to about 2.0% by weight to the total organic component weight of the mat 10.

The mat 10 is dimensioned for use, either as a mounting mat for mounting a pollution control element (e.g., a catalyst carrier, a filter element and/or a catalyzed filter element) within the housing of a pollution control device (e.g., a catalytic converter, engine exhaust filter, etc.) or as an end-cone insulator or other insulator for insulating an end-cone region or other region within a pollution control device in an exhaust system of an internal combustion engine.

General Procedure for Preparing Reinforced Mat Material

One double-layer embodiment of the mat 10 can be made according to the following procedure.

In general, to make each of the layers 16 and 18, a slurry is first produced by mixing, so as to evenly disperse, in a sufficient amount of water: an amount of ceramic fiber needed to obtain the target weight per unit area sought for the finished layer, an amount of organic binder needed to obtain the target loss of ignition (LOI) and an amount of a flocculant in the range of about 20% or more of the amount of organic binder. An exemplary slurry can be produced by mixing the following constituents in 10 liters of water: 98.5 percent by weight (wt %) of the desired ceramic fiber (e.g., alumina fiber), 1.5 wt % of a desired organic binder (e.g., a latex binder) and less than 0.3% of a desired flocculant (e.g., a flocculant sold by Mid-South Chemical, Ringold, Louisana under the trade designation MP 9307C).

One method of incorporating a mesh between the layers is by dewatering a slurry, like that mentioned above, in a papermaker's hand sheet mold using water gravity vacuum. This leaves a moist and durable sheet or layer, durable enough to be handled by hand temporarily. To incorporate the mesh, two such layers can be individually formed at the target basis weights and the mesh sandwiched between the layers. The resulting multilayer mat is then compressed. While in its compressed state, the mat is then dried, for example, in an oven at 150° C. for 30 minutes. Alternatively, the upper layer can be wet laid on top of the lower layer, with the mesh therebetween, if better mixing of ceramic fibers between the layers and through the mesh is desired.

An alternative method of incorporating the mesh into the mat is by making the first layer as described above and placing the mesh on top of the wet first layer, while the first layer is still on the hand sheet mold. The second layer is formed on top of the mesh by placing a diverter fixture on the handsheet mold, to avoid directly pouring of the second slurry onto the first wet layer. The second slurry is then poured on top of the mesh and on top of first layer. This is done by pouring the second slurry such that it hits the diverter fixture first so that the second layer is formed on top of the first mat and mesh and the structure of the first wet layer is not destroyed. The resulting multilayered mat is then dried in an oven as described above.

EXAMPLES

Summary of Examples 1-11

Example 1: Different fiber (Saffil LDM)

Example 2: Bigger mesh size

Example 3: Smaller mesh size

Example 4: Mesh with sizing binder

Example 5: Laminating with inorganic binder

Example 6: No opening with Cloth (Nextel)

Example 7: Different formulation (binder: LX816)

Example 8: Parallel fiber Mesh

Example 9: Skew to mat direction

Example 10: Two mesh in a mat

Example 11: Skew to mat direction

TABLE 1

Explanation of Mat Layer materials used in Examples

| Product Designation | Generic Name | Manufacture/Distributor |
|---|---|---|
| CEF02 | Refractory Ceramic Fibers | Mitsubishi Chemical |
| Saffil LDM | Alumina Fiber | Saffil Limited |
| Colloidal Silica-O | Colloidal Silica | Nissan Chemical |
| 600BP | EVA Latex | Air Products |
| LX-816A | Acrylic latex | Nippon Zeon |
| MP9307C | Floculant | Mid-South Chemical |

TABLE 2

Explanation of reinforcing material used in Examples

| | Reinforcing materials name | Distributor | Opening size (mm) | Remarks |
|---|---|---|---|---|
| A | Fiberglass netting | unknown | 8 × 13 | Storage in 3M center (Distributor unknown) |
| B | FibaTape ® | St. Gobain | 21 × 21 | lip off some strands from 3 × 3 opening size |
| C | FibaTape ® | St. Gobain | 12 × 12 | lip off some strands from 3 × 3 opening size |
| D | 3M ™ Nextel ™ Woven Fabric | 3M | no openings | |
| E | Laminet ® C33A5 80 V6 | Unitika U.G.F. | 3.6 × 3.6 | |
| F | SOF ® KC1010A 104 AD1 | Nittobo | 2.5 × 2.5 | Higher sizing binder content |
| G | Glass Fabrics L90 MN100FZ | Unitika U.G.F. | 1.6 × 1.6 | Leno type, small opening size |
| H | S-2 glass fiber | St. Gobain | 13 | |

TABLE 3

Results for the Examples

| Example no. | Mat composition (Remarks of samples) | Tensile Strength (N) |
|---|---|---|
| 1 | Saffil | 2.3 |
| 1 | Saffil with Net A | 33.4 |
| 2 | Co-formed | 4.0 |
| 2 | Co-formed with one strand net | 25.0 |
| 3 | Co-formed | 4.0 |
| 3 | Co-formed with net E | 77.6 |
| 4 | Co-formed | 4.0 |
| 4 | Co-formed with net F | 120.0 |
| 5 | Laminated | 3.6 |
| 5 | Laminated with net G | 298.7 |
| 6 | Laminated | 3.6 |
| 6 | Laminated with Nextel | 218.0 |
| 7 | LX-816A | 4.45 |
| 7 | LX-816A with net A | 31.3 |
| 8 | Co-formed with fibers H | 18.6 |
| 9 | Laminated | 3.6 |
| 9 | Laminated with skewed net A | 3.1 |
| 10 | Triple layered mat | 5.1 |
| 10 | Triple layered mat with two net A | 149 |
| 11 | Co-formed mat | 5.1 |
| 11 | Co-formed mat with net F | 29.3 |

Example 1

Two mats were prepared with Saffil alumina LDM fiber and EVA latex 600BP following typical wet laid mat making procedure of co-formed holding mat. One had the net A listed in above Table 2 between the two layers, the other didn't have. In this experiment, the latex amount was about 1.5% and weight per area of the mat is about 1200 g/m², with the weight per area of the top layer (i.e., the thinner layer) being about 80 g/m² and the weight per area of the lower layer (i.e., the thicker layer) being about 1120 g/m². The top layer also has an LOI of about 8% and the lower layer has an LOI of about 1%.

The results for tensile measurement are listed in the Table 3. As shown in the result, reinforcing net can work in various fiber mats.

Example 2

Two mats were prepared with CEF02 fiber and EVA latex 600BP following typical wet laid mat making procedure of co-formed holding mat for each net listed below. One of each had the net listed in above Table 2 between the two layers, the other of each didn't have. In this experiment, the latex amount was about 1.5% and weight per area of the mat is about 1200 g/m2, with the weight per area of the top layer (i.e., the thinner layer) being about 80 g/m² and the weight per area of the lower layer (i.e., the thicker layer) being about 1120 g/m². The top layer also has an LOI of about 8% and the lower layer has an LOI of about 1%.

The results for tensile measurement are listed in the Table 3. As shown in the result, big opening size net which has only a strand along test axis in a test piece can improve the tensile strength in such fragile mat.

Example 3

Two mats were prepared with CEF02 fiber and EVA latex 600BP following typical wet laid mat making procedure of co-formed holding mat for each net listed below. One of each had the net E listed in above Table 2 between the two layers, the other of each didn't have. In this experiment, the latex amount was about 1.5% and weight per area of the mat is about 1200 g/m2, with the weight per area of the top layer (i.e., the thinner layer) being about 80 g/m² and the weight per area of the lower layer (i.e., the thicker layer) being about 1120 g/m². The top layer also has an LOI of about 8% and the lower layer has an LOI of about 1%.

The results for tensile measurement are listed in the table 2. As shown in this result, this reinforcing net with the opening size at least 3.6 mm can be co-formed well and improves tensile strength. The netting with smaller opening size like net G has difficulty to co-form it in a mat sometimes. However there are some solutions for the problem such as by using a net comprising sizing binder described in Example 4 or by laminating described in Example 5 and 6.

Example 4

Two mats were prepared with CEF02 fiber and EVA latex 600BP following typical wet laid mat making procedure of co-formed holding mat for each net listed below. One of each had the net F listed in above Table 2 between the two layers, the other of each didn't have. In this experiment, the latex amount was about 1.5% and weight per area of the mat is about 1200 g/m2, with the weight per area of the top layer (i.e., the thinner layer) being about 80 g/m$^2$ and the weight per area of the lower layer (i.e., the thicker layer) being about 1120 g/m$^2$. The top layer also has an LOI of about 8% and the lower layer has an LOI of about 1%.

The results for tensile measurement are listed in the Table 3. As shown in this result, this reinforcing net with sizing binder on its strands makes layer bonding tougher and improves the tensile strength.

Example 5

Four mats were prepared with CEF02 fiber and EVA latex 600BP following typical wet laid mat making procedure of holding mat. And a new mat was made with two of four mats by laminating with Colloidal Silica O. And another new mat was made with the other two mats and the net G listed in above Table 2 by laminating with Colloidal Silica O as an inorganic adhesive. The net was placed between the two mats. In this experiment, the latex amount was about 1.5% and weight per area of the mat is about 1000 g/m2, with the weight per area of the top layer being about 500 g/m$^2$ and the weight per area of the lower layer being about 500 g/m$^2$. Both the top and lower layers each have an LOI of about 1.5%.

The results for tensile measurement of the two mats are listed in the Table 3. As shown in the result, this reinforcing net works in laminated mats. And a net which has too small opening size to co-form between two layers like net G can be used if this type of lamination is used.

Example 6

Four mats were prepared with CEF02 fiber and EVA latex 600BP following typical wet laid mat making procedure of holding mat. And a new mat was made with two of four mats by laminating with Colloidal Silica O. And another new mat was made with the other two mats and the Nextel Woven Fabric listed as D in above Table 2 by laminating with Colloidal Silica O as an inorganic adhesive. The cloth was placed between the two mats. In this experiment, the latex amount was about 1.5% and weight per area of the mat is about 1000 g/m2, with the weight per area of the top layer being about 500 g/m$^2$ and the weight per area of the lower layer being about 500 g/m$^2$. Both the top and lower layers each have an LOI of about 1.5%.

The results for tensile measurement of the two mats are listed in the Table 3. As shown in the result, if the reinforcing material doesn't have opening size, it can be laminated by inorganic or organic binder and can work as a strength improving agent in a fragile mat.

Example 7

Two mats were prepared with CEF02 fiber and acrylic latex LX-816A following typical wet laid mat making procedure of co-formed holding mat. One had the net A listed in above Table 2 between the two layers, the other didn't have. In this experiment, the latex amount was about 1.5% and weight per area of the mat is about 1200 g/m2, with the weight per area of the top layer (i.e., the thinner layer) being about 80 g/m$^2$ and the weight per area of the lower layer (i.e., the thicker layer) being about 1120 g/m$^2$. The top layer also has an LOI of about 8% and the lower layer has an LOI of about 1%. The results for tensile measurement are listed in the Table 3. As shown in the result, this reinforcing net works in various binder and making method mats.

Example 8

One mat was prepared with CEF fiber and EVA latex 600BP following typical wet laid mat making procedure of co-formed holding mat, with the fibers H listed in above Table 2 therebetween. In this experiment, the LOI for the mat is about 1.82 wt % and weight per area of the mat is about 1160 g/m2.

The results for tensile measurement are listed in the table 3. As shown in this result, the reinforcing mesh does not need to be a netting.

Example 9

Two mats were prepared with CEF02 fiber and EVA latex 600BP following typical wet laid mat making procedure of co-formed holding mat. One had the net #1 listed in above Table 2 which was placed to have the composing strands not going along to the tensile measurement axis between the two layers and the other didn't have. In this experiment, the latex amount was about 1.5% and weight per area of the mat is about 1200 g/m2, with the weight per area of the top layer (i.e., the thinner layer) being about 80 g/m$^2$ and the weight per area of the lower layer (i.e., the thicker layer) being about 1120 g/m$^2$. The top layer also has an LOI of about 8% and the lower layer has an LOI of about 1%.

The results for tensile measurement are listed in the Table 3. As shown in this result, reinforcing net which doesn't have strand going along to the tensile measurement axis can improve the tensile strength for such fragile mat.

When a net is placed with fibers skewed to the mat direction (e.g., see FIG. 1B), the composite strands can act like a pair of scissors and the mat can become delaminated.

Example 10

Six mats were prepared with CEF02 fiber and EVA latex 600BP following typical wet laid mat making procedure of single layer holding mat. Three of six mat were laminated alternately with two net A listed in above Table 2 using Colloidal Silica O as an inorganic adhesive and the other three of six were laminated without net. In this experiment, the latex amount was about 1.5% and weight per area of the mat is about 1500 g/m2, with the weight per area of each layer being about 500 g/m$^2$ and the LOI of each layer being about 1.5%.

The results for tensile measurement are listed in the Table 3. As shown in this result, a mat comprises more than one reinforcing layer can improve tensile strength and bend durability of the mat.

Example 11

Two mats were prepared with CEF02 fiber and EVA latex 600BP following typical wet laid mat making procedure of co-formed holding mat for each net listed below. One of each had the net listed in above Table 2 between the two layers, the other of each didn't have. The net was placed 15 degree to the tensile axis. In this experiment, the latex amount was about 1.5% and weight per area is about 1200 g/m2.

The results for tensile measurement are listed in the Table 3. As shown in the result, reinforcing net which doesn't have strand going along to the tensile measurement axis can improve the tensile strength for such fragile mat. And also, skew net can give some elongation based on the degree wherein the net along the tensile measurement direction has almost no elongation.

This invention provides a mat having a low to no total organic component weight, with higher tensile strength and better crack durability by using a mesh of non-metallic fibers between layers comprising ceramic fibers. Such a mesh acts as a reinforcing layer that improves the tensile strength and surface crack durability of the resulting mat material. It has been found that, in general, mats without a mesh with a higher LOI exhibit higher tensile strength. It has also been found that a mesh of parallel strands can provide tensile strength equal to about 6.5% binder content.

This invention may take on various modifications and alterations without departing from its spirit and scope. Accordingly, this invention is not limited to the above-described but is to be controlled by the limitations set forth in the following claims and any equivalents thereof.

This invention may be suitably practiced in the absence of any element not specifically disclosed herein.

All patents and patent applications cited above, including those in the Background section, are incorporated by reference into this document in total.

What is claimed is:

1. A reinforced mat for a pollution control device, said mat having a first major surface, a second major surface and a thickness, and said mat comprising ceramic fibers and a reinforcing mesh disposed between said first major surface and said second major surface such that said mat is generally separated into two layers by said mesh, said mesh comprising non-metallic fibers that are spaced-apart so as to define a space therebetween that is large enough that the layers of said mat are integrally joined together through said mesh,
   wherein said mat has a total organic component weight that is less than or equal to about 5% of the total weight of said mat, and said mat is dimensioned for use, either as a mounting mat for mounting a pollution control element or as an insulator for insulating a region within a pollution control device in an exhaust system of an internal combustion engine.

2. The mat according to claim 1, wherein said mesh is generally co-planar with said first major surface and said second major surface.

3. The mat according to claim 1, wherein said mesh is made of polymeric fibers, which contribute in the range of from about 0.4% to about 2.0% by weight to the total organic component weight of said mat.

4. The mat according to claim 1, wherein the spaced apart non-metallic fibers of said mesh are separated a minimum distance of at least about 1.5 mm.

5. The mat according to claim 1, wherein the spaced apart non-metallic fibers of said mesh are separated a minimum distance in the range of from at least about 1.5 mm to at least about 8.0 mm.

6. The mat according to claim 1, wherein the spaced apart non-metallic fibers of said mesh are separated a distance in the range of from about 1.5 mm to about 25 mm.

7. The mat according to claim 1, wherein the spaced-apart non-metallic fibers of said mesh are disposed so as not to intersect one another.

8. The mat according to claim 1, wherein the spaced-apart non-metallic fibers of said mesh are disposed so as to overlap one another and form a netting with openings defined by spaced-apart and overlapping non-metallic fibers of said mesh.

9. The mat according to claim 8, wherein said openings have a mesh size in the range of from about 2.25 mm$^2$ to about 625 mm$^2$.

10. The mat according to claim 1, wherein the total organic component weight of said mat is less than or equal to about 2.5% of the total weight of said mat.

11. The mat according to claim 1, wherein the total organic component weight of said mat is less than or equal to about 1.5% of the total weight of said mat.

12. The mat according to claim 1, wherein said mat is dimensioned for use as a mounting mat for mounting a pollution control element within the housing of a pollution control device.

13. The mat according to claim 1, wherein said mat is dimensioned for use as an insulator for insulating within an end-cone region of a pollution control device.

14. A pollution control device comprising a pollution control element and a reinforced mat according to claim 1 being disposed in a housing.

15. The device according to claim 14, wherein said reinforced mat is a mounting mat disposed between said pollution control element and said housing.

16. The device according to claim 14, wherein said housing comprises an end-cone region, and said reinforced mat is an insulator disposed within said end-cone region.

17. An exhaust system for an internal combustion engine, said exhaust system comprising said pollution control device according to claim 14.

18. An internal combustion engine comprising said exhaust system according to claim 17.

19. A method of making a reinforced mat according to claim 1, said method comprising:
   forming a first layer comprising ceramic fibers;
   forming a second layer comprising ceramic fibers;
   sandwiching the mesh between a major face of the first layer and a major face of the second layer;
   attaching the major face of the first layer and the major face of the second layer together such that the first layer and the second layer of the mat are integrally joined together through at least a portion of the space of the mesh; and
   dimensioning the mat for use, either as a mounting mat for mounting a pollution control element, or as an insulator for insulating a region, within a pollution control device in an exhaust system of an internal combustion engine,
   wherein the resulting mat has a total organic component weight that is less than or equal to about 5% of the total weight of the mat.

20. The method according to claim 19, wherein the major face of the first layer and the major face of the second layer are attached together using auxiliary bonding means.

* * * * *